United States Patent
Syomichev et al.

(10) Patent No.: US 10,298,582 B2
(45) Date of Patent: May 21, 2019

(54) ENVIRONMENT-DIFFERENTIATED NAMED CREDENTIAL INSTANCES FOR DEVELOPMENT AND DEPLOYMENT

(71) Applicant: salesforce.com, inc., San Francisco, CA (US)

(72) Inventors: Alexey Syomichev, Westport, CT (US); Lawrence Eugenio McAlpin, Bloomington, IN (US); William Charles Mortimore, Jr., San Francisco, CA (US)

(73) Assignee: salesforce.com, inc., San Francisco, CA (US)

( * ) Notice: Subject to any disclaimer, the term of this patent is extended or adjusted under 35 U.S.C. 154(b) by 168 days.

(21) Appl. No.: 15/158,277

(22) Filed: May 18, 2016

(65) Prior Publication Data
US 2017/0339148 A1 Nov. 23, 2017

(51) Int. Cl.
| | |
|---|---|
| G06F 21/00 | (2013.01) |
| G06F 21/31 | (2013.01) |
| G06F 21/62 | (2013.01) |
| H04L 29/06 | (2006.01) |
| H04L 29/08 | (2006.01) |

(52) U.S. Cl.
CPC .............. *H04L 63/10* (2013.01); *G06F 21/00* (2013.01); *G06F 21/31* (2013.01); *G06F 21/6218* (2013.01); *G06F 21/6245* (2013.01); *H04L 63/08* (2013.01); *H04L 63/105* (2013.01); *H04L 67/02* (2013.01); *H04L 67/2804* (2013.01); *H04L 67/2814* (2013.01); *G06F 2221/2149* (2013.01); *H04L 63/1433* (2013.01)

(58) Field of Classification Search
CPC ...... H04L 63/10; H04L 63/0428; H04L 67/02
USPC .............................................. 726/4
See application file for complete search history.

(56) References Cited

U.S. PATENT DOCUMENTS

| | | | | |
|---|---|---|---|---|
| 9,178,868 | B1 * | 11/2015 | Leung | ............ H04L 67/02 |
| 2013/0318581 | A1 * | 11/2013 | Counterman | ......... H04W 12/06 726/7 |
| 2016/0352753 | A1 * | 12/2016 | Roth | ............ G06F 21/31 |

* cited by examiner

*Primary Examiner* — Harunur Rashid
*Assistant Examiner* — Angela R Holmes
(74) *Attorney, Agent, or Firm* — Sterne, Kessler, Goldstein & Fox P.L.L.C.

(57) ABSTRACT

Controlling access to sensitive data can be difficult during an application development effort. A developer may not be authorized to see the data that is to be used by the application. Credentials used in a development environment to access development data can require modification when the application is migrated to a deployed environment. Changing the code in the deployed environment increases risks of change induced incidents. The technology disclosed allows for the creation of a named credential object, where the credentials for different environments are stored, and where the named credential object is called by metadata. This allows the promotion of code from a development environment to a deployed environment without changes to code, and without giving access to sensitive data to the developer.

21 Claims, 9 Drawing Sheets

ENVIRONMENT-DIFFERENTIATED NAMED CREDENTIAL INSTANCES FOR DEVELOPMENT AND DEPLOYMENT

RELATED APPLICATIONS

The following commonly owned U.S. Patent Application is incorporated by reference as if fully set forth herein: U.S. application Ser. No. 14/711,485, entitled "Systems And Methods Of Implementing Tracking Of Resource Usage For A Cloud-Based System", filed 13 May 2015.

TECHNICAL FIELD

This disclosure relates generally to credentials for authentication, and more particularly, to systems and methods for initiating connections to non-host services securely using the credentials, without revealing the credentials themselves to a developer or end user.

BACKGROUND

The subject matter discussed in this section should not be assumed to be prior art merely as a result of its mention in this section. Similarly, a problem mentioned in this section or associated with the subject matter provided as background should not be assumed to have been previously recognized in the prior art. The subject matter in this section merely represents different approaches, which in and of themselves may also correspond to implementations of the claimed technology.

Consider the growing popularity of cloud computing and software as a service ("SaaS") that has led to the development of software platforms for businesses and other enterprises that provide more advanced cloud-based products and services, in addition to simple data storage and management requirements. Enterprise providers offer a number of customer relationship management ("CRM") products and services that are cloud-based solutions upon which relevant applications can be launched and/or built for any business or enterprise, and can be integrated with external services from other vendors.

For example, an enterprise platform can be widely used for the development and deployment of mobile applications in an enterprise network. The platform can be built on a core integrated development environment ("IDE")—a set of tools and services for creating and launching user-facing applications that are both mobile and social. The platform can include a number of standard applications, which may be extended by customization, or custom applications may be created. The platform can also include access to a store for applications which is similar to the iTunes App Store, but for business applications. Applications available through the store for applications and developed by customers can be integrated with external services.

Credentials for external services are vulnerable to leakage, to dissemination to developers and end users. This leakage can be difficult to monitor because the external services have their own security envelopes, distinct from the host system that integrates with them, distinct from an enterprise platform, for instance.

Accordingly, an opportunity arises to improve the security of integration, both during development and in the hands of end users, between a host system and an external service. Methods, systems (devices) and articles of manufacture are disclosed that address integration security.

BRIEF DESCRIPTION OF THE DRAWINGS

The included drawings are for illustrative purposes and serve only to provide examples of structures and process operations for one or more implementations of this disclosure. These drawings in no way limit any changes in form and detail that can be made by one skilled in the art without departing from the spirit and scope of this disclosure. A more complete understanding of the subject matter can be derived by referring to the detailed description and claims when considered in conjunction with the following figures, wherein like reference numbers refer to similar elements throughout the figures.

DETAILED DESCRIPTION

The following detailed description is made with reference to the figures. Sample implementations are described to illustrate the technology disclosed, not to limit its scope, which is defined by the claims. Those of ordinary skill in the art will recognize a variety of equivalent variations on the description that follows.

Maintaining security around credentials for access to external services, such as web services, continues to be a complex issue. Web sites can sometimes be hacked by methods such as simple SQL injections, cross-site scripting, and cookie poisoning, which can expose credentials in use. Memory hacking can also occur using simple tools such as a browser debugger, more complex tools such as Memory Hacking Software (MHS) and RAM scrapers, and complex methods such as the row hammer technique published by Google. External services can be written to avoid these hacks, but avoidance efforts can be difficult and uncertain. Information leakage is also a problem, with yet a different set of solutions.

External services are most often independent of a host service, which is one reason that they are outside a host-security envelope. Independent in this context means unaffiliated, so the external service is not associated with the host as a subordinate or subsidiary. Independent, non-controlled external services control their own security, instead of having security dictated by the host service, which is part of the motivation for our separate security facility, for our so-called named credentials engine.

Information leaks can occur when system data or debugging information exits an application through an output stream or logging function during exception handling. Errors can be injected by an attacker to reveal data within error messages. For example, a badly formed SQL connection injected into a data stream can result in an error message identifying an ID and password for a valid connection. Avoidance of leakage can include the parsing of error messages before they are delivered to the end user. Avoidance can also include the removal of debug information within a deployed environment. Capturing all exceptions with a generic custom, global, or a page level error handler can help. But this is sometimes overlooked, or improperly configured.

Figure 1:
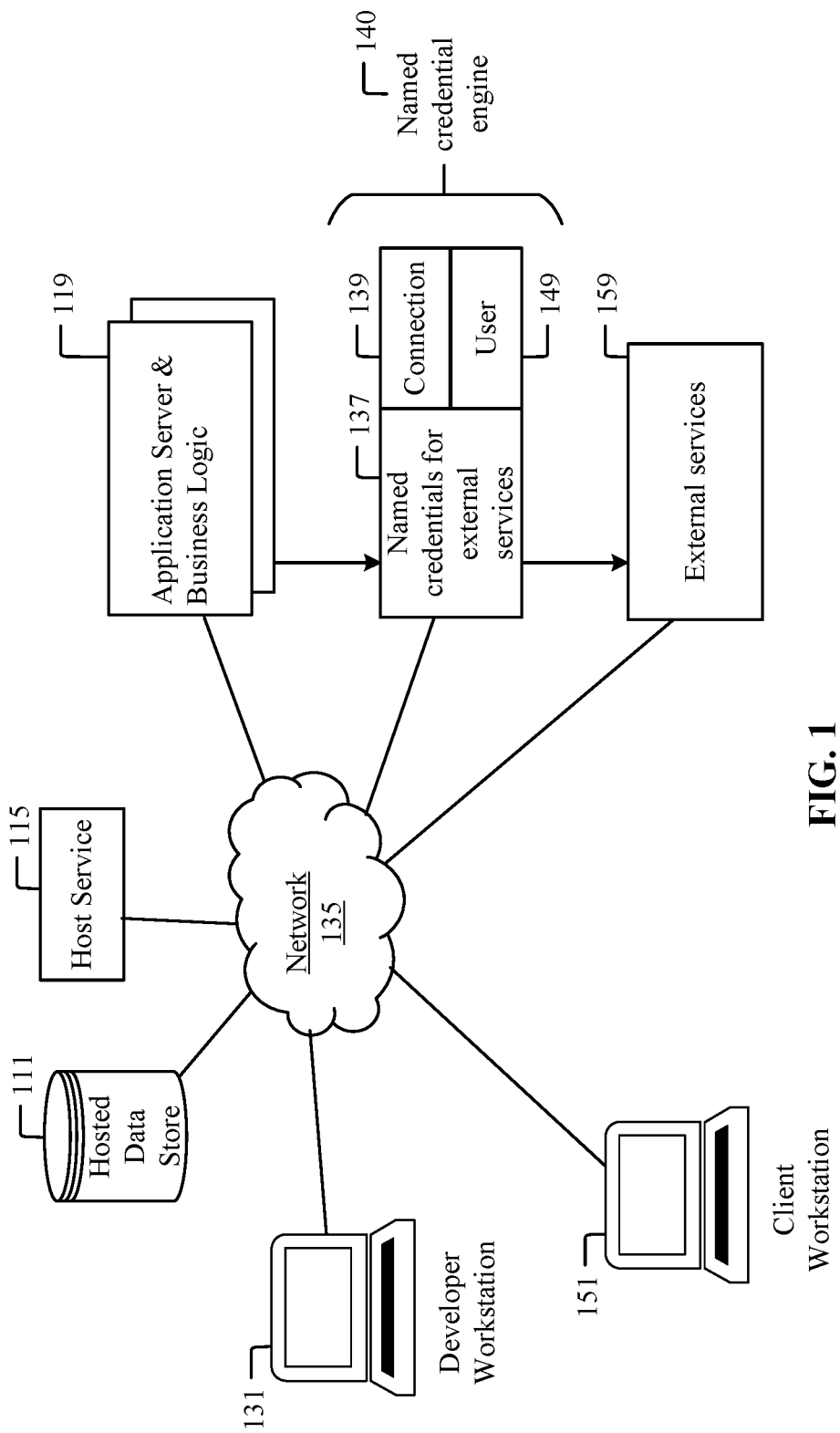
FIG. 1 illustrates one example of an environment that uses named credentials for authentication with external services.

A developer can develop an application for use by any number of tenants in a multi-tenant environment. As an additional risk to hacking and information leakage, the developer might not have authorization to see the data available to the tenants, but may be required to have access to credentials to access the data for installation and testing. The technology disclosed secures the credentials used to connect to external services, also known as non-host services, without including the credentials in memory exposed to a developer. The technology disclosed also allows the application to be developed by a developer, and used by an end user in the same environment, or in another environment, without modification. In this example, a developer can develop an application. FIG. 1 illustrates an example of an environment utilizing the technology disclosed to securely apply user credentials and connection information using a named credentials engine.

Environment

FIG. 1 illustrates one example of an environment that uses named credentials for authentication with external services. The environment includes an internal host service 115 with a hosted data store 111. The environment also includes a plurality of servers running applications and business logic, the combination comprising a business logic tier 119, which include at least one application being developed by a developer at a developer workstation 131. This disclosure refers to parts of the computer application being developed that access external services via endpoints using credentials as business logic. Sometimes, we refer to the applications and business logic under development as a business logic tier. The term business logic tier is not meant to distinguish between a presentation tier and a logic tier, but to inclusively refer to the computer application under development that interfaces with external services. The environment also includes an organization/user workstation 151, herein referred to as a client workstation 151, and a cloud network 135.

The internal host service 115 supplies internal services and a host-security envelope. The internal services include authentication and authorization, name space resolution, and compute and storage resources to the business logic tier 119 and the client workstation 151 within the multi-tenant environment. Validated credentials allow the use of host service facilities as a host-security envelope. Within the reach of the host's authentication and authorization, a user is within the host-security envelope. In this example, communications between objects such as the internal host service 115 and external service 159, the hosted data store 111, and the client workstation 151 can occur via a cloud network 135. A client workstation 151 is first authenticated into the host-security envelope of the internal host service 115, which then allows the client workstation to access applications in the business logic tier 119.

A host-provided named credentials engine 140 provides a level of indirection between the business logic tier 119 and credentials that do not need to be exposed to developers and end users. The named credentials engine 140 includes a named credential object 137 which encapsulates connection data and methods. Encapsulated data includes at least one end-point connection 139, which can be a URL. The end-point connection 139 information can also include how the end-point is secured such as by OAuth tokens, API keys, or passwords as user credentials 149. The user credentials 149 can apply to a global connection for all users within an organization, to a specific user, role, or position in a user hierarchy, or any other logical grouping of users and execution contexts that access the external services 159. The external services 159 are sometimes referred to as non-host services. In one example, the end-point connection 139 can be an HTTP connection to an external non-host service.

In this example, the application running within the business logic tier 119 is configured to access external services 159. Historically, the credentials used to access the external services are included in the code within the business logic tier. The technology disclosed allows the developer to develop the application so that it makes the connection with the external service using indirection. The business logic tier 119 invokes a named credential object 137 using a late binding reference to a named credential. The invocation of the named credential is intercepted by the named credentials engine 140. The end-point connection 139 information and the user credentials 149 required for the connection are extracted from the named credential object 137 and injected into the data stream generated by the business logic tier 119, then forwarded to the external service 159. Named credentials support technologies such as basic password authentication, Security Assertion Markup Language (SAML) 2.0 and OpenID Connect (OIDC)/OAuth 2.0. Named credentials can be organized in a hierarchy where user credentials can be shared between multiple users or organizations. Named credentials can also be inherited from users in a hierarchy.

In one implementation, a hierarchical structure can store information such as an organization chart represented as a directed acyclic graph, where the organization chart can contain information regarding roles and relative positions within an organization. In this example, different roles and relative positions can have different access to information within an external service 159. Roles can be assigned to any node in the hierarchy, and different roles can have different levels of access. For example, the role of "executive" can have access to financial information, where the credentials for the role "executive" are stored in a named credential named "executive named credential". And the role of "mechanic" can have access to engineering information, where the credentials for the role "mechanic" are stored in a named credential named "mechanic named credential". A person can be a member of more than one role. In this example, the technology disclosed can be configured to apply standard Role-Based Access Control (RBAC) policies in selecting the appropriate named credential.

Relative positions can comprise a person, who the person reports to, and the direct reports of the person. In one example, "Mary", the manager of a department, can have access to both human resources data for her team, and production information for her team, while everyone below "Mary" in the organization chart can have access to the production information only. In another example, everyone except "Milton" can have access to a set of sales data, while everyone who works in "Research and Development" can have access to clinical trial data. In another example, "Tom" can have credentials that authorize him to read and write information in an external service 159, while everyone below "Tom" in the hierarchy are assigned a shared credential that only authorizes them to read information from the external service. In another example, a service account, such as "Regular User" can be used as a credential for all users in an organization, and be stored in a named credential named "regular user named credential". In these examples, a late binding is performed as a name resolution service that resolves names within a namespace.

Named credential parameters 305, as described in FIG. 3 below, are passed to the named credentials engine 140. The named credential parameters 305 include information such as the organization, role, or user requesting the external service.

Figure 2:
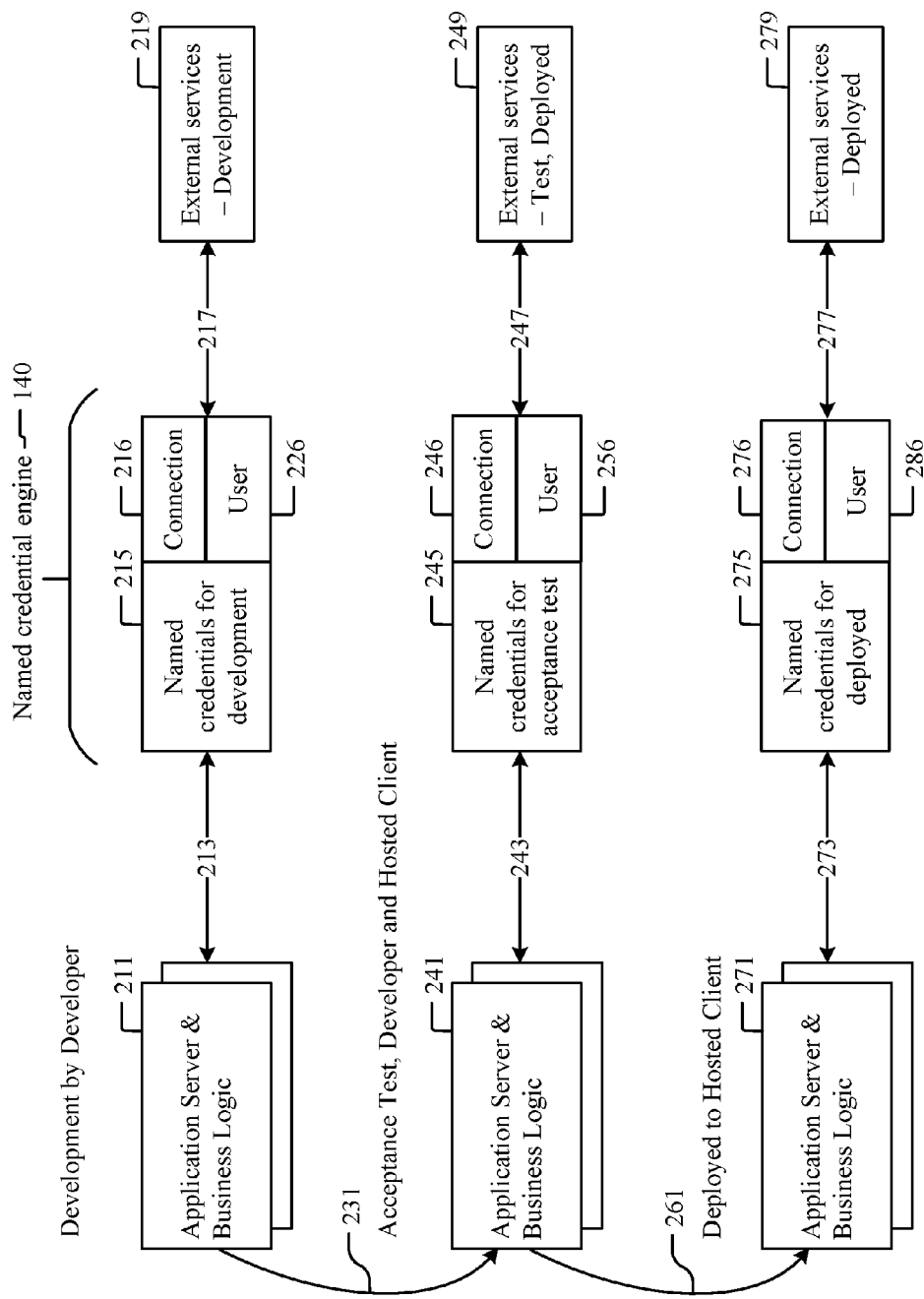
FIG. 2 illustrates the use of named credentials by multiple environments allowing for code migration between environments without code changes for authentication.

Instances of a named credential object establish the connection in the manner described by the business logic tier 119, applying the appropriate context to determine the credentials that will be used in the actual connection. For example, the application in a business logic tier 119 with a named credential object 137 that has a developer context will have end-point connection 139 information and user credentials 149 applied by the named credentials engine 140 specifically for the developer. However, a client workstation 151 using the application, using the same named credential, but within the context of the user or organization will have end-point connection 139 information and user credentials 149 applied by the named credentials engine 140 specifically for the client workstation 151. The named credentials engine 140 injects the end-point connection 139 information and user credentials 149 of the named credential object specific to the context of the name credential indirection. This can prevent the business logic tier 119 from accessing the credentials used within the outgoing service request. This indirection based on context can occur within the same environment. FIG. 2 illustrates how this indirection can occur based on different environments.

Named Credentials in Multiple Environments

FIG. 2 illustrates the use of named credentials by multiple environments allowing for code migration between environments without code changes for authentication. The example depicts development, acceptance test and deployed environments. This is a simple example that corresponds to an outside developer preparing software that interacts with a host and delivering it to a tenant of the host service. In a complicated example, a large health environment might have hundreds of environments to support development, testing and deployment of complex hospital and clinic software. In simpler examples, there might be just two environments. For outside development, the environments might be development and deployment environments, which have separate instances of a named credentials engine. For inside development, a single named credentials engine could be shared between development and deployed environments. The deployed environment could, alternatively, be called a production environment.

This implementation includes a plurality of development application and business logic servers 211, referred to herein as a development business logic tier 211, a development named credential object 215 for end-point connect 216 and user information 226, and development non-host services 219. This implementation also includes a plurality of test application and business logic servers 241, referred to herein as a test business logic tier 241, a test named credential object 245 for end-point connect 246 and user information 256, and test non-host services 249. This implementation also includes a plurality of deployed application and business logic servers 271, referred to herein as a deployed business logic tier 271, a deployed named credential object 275 for end-point connect 276 and user information 286, and deployed non-host services 279, also referred to herein as external services 279. A named credentials engine 140 is also included. In one implementation, a single named credentials engine can be implemented across multiple environments. In another implementation, each environment can have an instance of a named credentials engine.

Historically, the development business logic tier 211 would include logic including the end-point connection 216 and user information 226 for connection to the development non-host services 219. The technology disclosed separates the end-point connection 216 and user information 226 from the development business logic tier 211, and stores it in a development named credential object 215 within a development instance of a host-provided named credentials engine that is environment-specific to the development environment. The development business logic tier 211 uses indirection based on a metadata name to access the named credentials 213 for authentication with the non-host services 217. Having separate instances of the host-provided named credentials engine allows them to be environment-specific and even to run on different machines in different organizations. As discussed, some scenarios may share a host-provided named credentials engine among organizations and environments, so it is not essential to have environment specific instances.

An application developed in the development business logic tier 211 can be migrated, or promoted 231, to the test business logic tier 241 without modification, using the same metadata names for named credentials, including named credential objects 215 and named credentials engines 140. The technology disclosed separates the end-point connection 246 and user information 256 from the test business logic tier 241, and stores it in a test named credential object 245 within a test instance of a host-provided named credentials engine that is environment-specific to the test environment. The test business logic tier 241 uses indirection based on the metadata name to access the named credentials 243 for authentication with the non-host services 247. The method used to invoke a named credential object within a named credentials engine in a development environment matches the access method used to invoke a named credential object within a named credentials engine in a deployed environment.

An application tested in the test business logic tier 241 can be promoted 261 to the deployed business logic tier 271 without modification, using the same metadata names for named credentials. The technology disclosed separates the end-point connection 276 and user information 286 from the deployed business logic tier 271, and stores it in a deployed named credential object 275 within a deployed instance of a host-provided named credentials engine that is environment-specific to the deployed environment. A deployed named credential can be referred to as a production named credential when the application being developed is deployed in production. The deployed business logic tier 271 uses indirection based on the same metadata name used in the test business logic tier 241 to access the named credentials 273 for authentication with the non-host services 277.

In another implementation, a developer can develop an application on a deployed business logic tier 271 that has a plurality of named credential objects 275 accessing a plurality of external services 279. In this implementation, the developer develops the application in the same environment in which it was deployed.

In another implementation, a third party can distribute an application that an application administrator can install into an environment. In this example, the application is developed remotely using named credentials. Different tenants within the environment can install the application, and people identified within each tenancy can be assigned to named credential objects for access to subsets of the data without direct access to the credentials required for access to the data. A named credentials engine can inject the information from an appropriate named credential object into a data stream. A data structure is illustrated in FIG. 3 that can store the connection and user credential information required by a named credentials engine.

Credential Parameters

Figure 3:
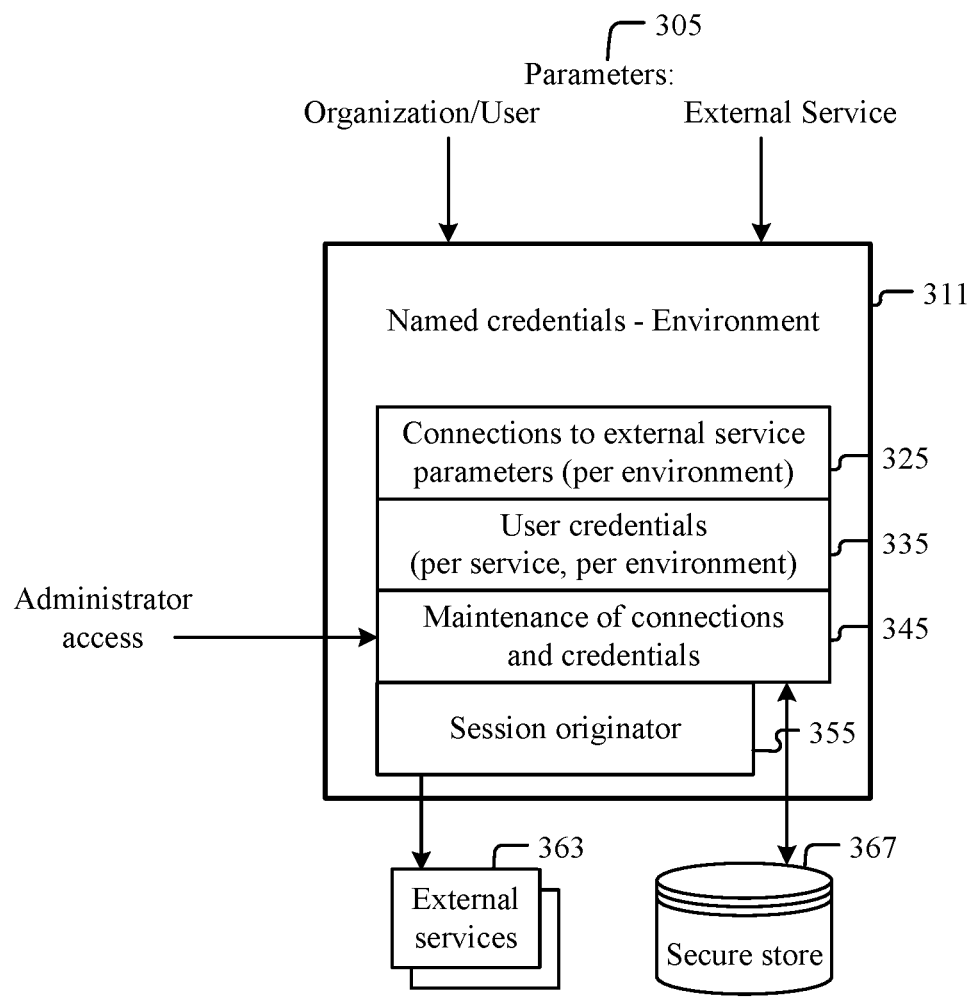
FIG. 3 illustrates a named credential object for one environment.

FIG. 3 illustrates a named credential object for one environment. A named credential object 311 comprises connection information 325 for external services and user credentials 335. The named credential object 311 also comprises credentials of an administrator, or group of administrators, that are authorized to maintain the named credential object 345. Named credential parameters 305, such as the organization, role, or user requesting the external service and the identity of the external service, are passed to the named credential object by a business logic tier. FIG. 3 also illustrates external services 363 used by the business logic tier and a secure store 367 where the named credential object 311 information is stored. A session originator 355 can be a protocol such as HTTPS or Cloud Trust Protocol (CTP).

In one implementation, code can be used to implement a named credential object for authentication to a non-host service, using a strongly typed, object-oriented programming language, such as APEX, that allows developers to execute flow and transaction control statements on an enterprise platform server in conjunction with calls to the enterprise API. Using syntax that looks like Java and acts like database stored procedures, the code can enable developers to add business logic to most system events, including button clicks, related record updates, and view control pages. The described code can be initiated by Web service requests and from triggers on objects.

One source of hosted multi-tenant platforms is hosted platform as a service (PaaS) providers. From a PaaS platform, a developer can develop, run, and manage applications without the complexity of building and maintaining the infrastructure required for application development. One implementation includes Force.com, a platform as a service (PaaS) that allows developers to create multi-tenant add-on applications that integrate into the main Salesforce.com application. Force.com applications are hosted on Salesforce.com's infrastructure. Force.com applications are built using APEX and Visualforce, which is typically used to generate HTML.

In a cloud environment, APEX works as does an operating system kernel, where APEX has complete control over resource allocation. An application running under APEX is allocated specific resources such as memory, and is not allowed to access any resources outside of the allocation. An APEX application running within a business logic tier is allocated an address range. A named credentials engine, which is also running within APEX, is allocated a different, non-overlapping address range. The application does not have any access to the address range of the named credentials engine, including memory addressed within pointers. As such, attempts within the application address range to hack the memory assigned to the named credentials engine are blocked by APEX.

As well, APEX controls leakage by controlling event handling for the application. Applications cannot configure event handling themselves, which removes leakage as a risk. APEX is one tool that can keep memory used by the named credentials engine from being exposed to the developer.

In the following example, an application will perform a direct HTTP request for an external service. Historically, the request for an external service can include the ID and password for the connection:

```
HttpRequest req = new HttpRequest( );
req.setEndpoint('https://my_endpoint.example.com/some_path');
req.setMethod('GET');
String username = 'myname';// hardcoded or loaded from org data
String password = 'mypwd'; // hardcoded or loaded from org data
Blob headerValue = Blob.valueOf (username +':'+password);
String authorizationHeader = 'BASIC'+EncodingUtil.base64Encode
(headerValue);
req.setHeader('Authorization', authorizationHeader);
HTTPResponse res = http.send(req);
```

The "some_path" component of the req.setEndPoint field is the third part of a URL (per RFC 1738) following the protocol (e.g., HTTP://) and the machine name (typically, a domain name). It is the name of a resource, given as a path.

It is curious that a so-called HTTP "Authorization" header is used for authentication, as computer security nomenclature distinguishes between authentication and determining authorizations that follow from authentication. This idiomatic usage stems from an RFC. The "Authorization" field of the req.setHeader method is used to store the authentication information required by the connection, as defined in RFC 2616, which expects failed credentials to provoke a response of "401 Unauthorized".

The authorization is stored in the blob headerValue within the application logic, which makes it susceptible to hacking and leakage. The technology disclosed allows an application to connect to a resource by referencing a "callout" to a named credential named "My_Named_Credential":

```
HttpRequest req = new HttpRequest( );
req.setEndpoint('callout:My_Named_Credential/some_path');
req.setMethod('GET');
HTTPResponse res = http.send(req);
```

In this example, the named credentials engine finds a named credential object 311 titled "My_Named_Credential", extracts the connection information 325 and user credentials 335, and injects them into the header of the HTTP request within the named credentials engine address space. The messaging required for this injection is outlined in FIG. 4.

Message Map Example

Figure 4:
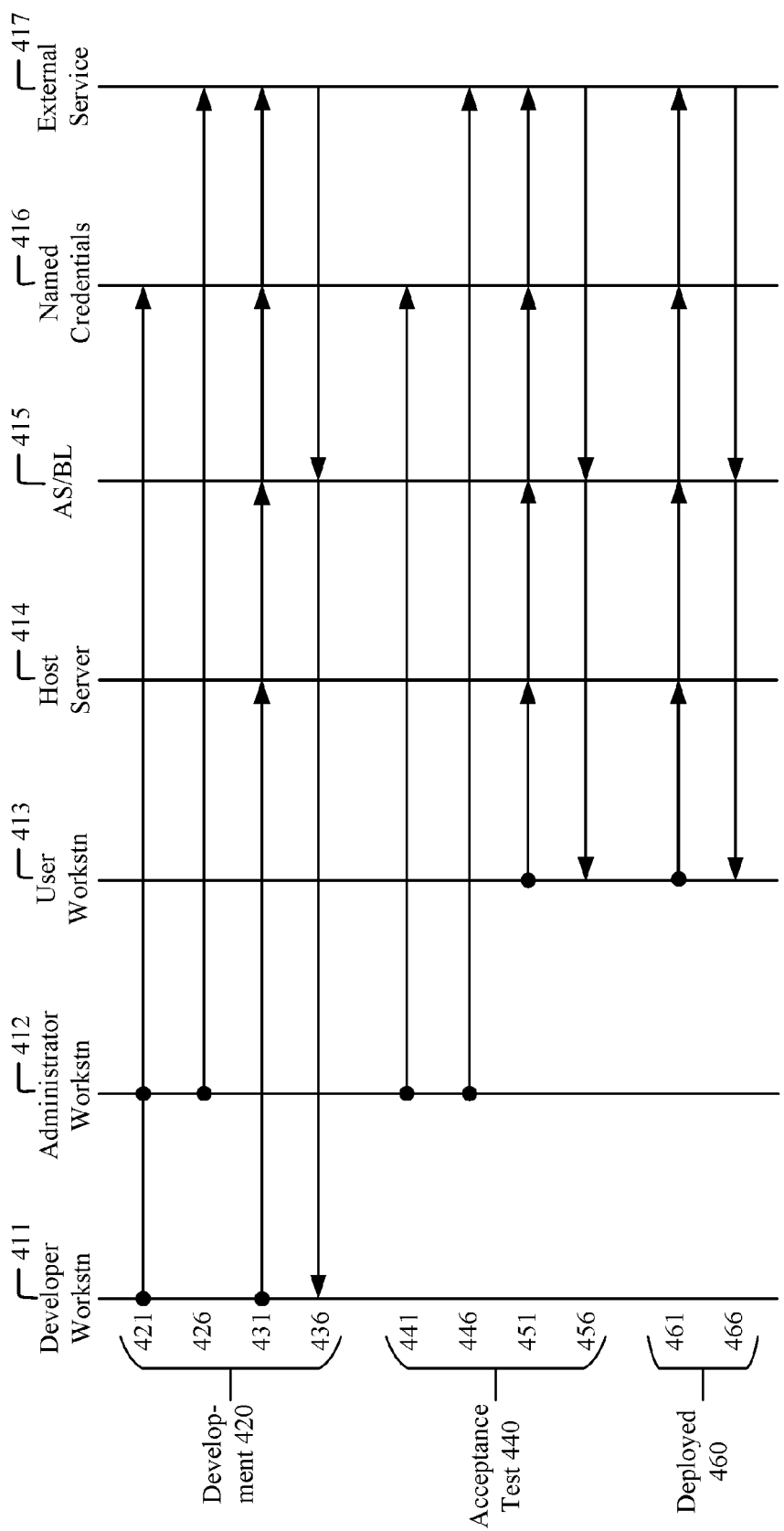
FIG. 4 illustrates a message map for a plurality of environments.

A message map can be used to clarify the communications between various actors and systems. FIG. 4 illustrates a message map for a plurality of environments. This example includes a developer workstation 411, an administrator workstation 412, and a user workstation 413. This example also includes a host server 414, a server that can be an application server or business logic server 415 (also referred to herein as business logic tier 415), named credentials 416, and an external service 417. There are three environments depicted in FIG. 4, including a development environment 420, an acceptance test environment 440, and a deployed environment 460. In one implementation, an application can be developed in the development environment 420 using a first set of named credentials 416. The application can then be copied to an acceptance test environment 440, which uses a second set of named credentials 416. The application can then be copied to a deployed environment 460, which uses a third set of named credentials 416. In another implementation, an application can be developed, tested, and deployed in the same environment.

The small circles indicate an action by an actor such as a developer, an administrator, or a user of an application. For 421 in the development environment 420, a developer working on the developer workstation 411 collaborates with an administrator working on the administrator workstation 412 to create a set of named credentials 416 for an application. The set of named credentials 416 can comprise one named credential for an organization, a plurality of named credentials for groups within an organization, or a plurality of users within an organization, for example. For 426 in the development environment 420, the administrator enters appropriate credentials and connection information for access to external services 417 into each member of the set of named credentials 416. The administrator can configure one or more named credential objects 311 for one or more environments. This allows actors with different credentials access to different non-host services across one or more environments without allowing any access to the credentials of other actors, or requiring any code changes to the application.

For 431 in the development environment 420, the developer creates an application that will execute on a host server 414 and a business logic tier 415. After authenticating the developer, the host server 414 connects to the business logic tier 415, which engages named credentials 416 by reference. A named credentials engine 140 can identify the appropriate named credential object 311 from the named credential parameters 305. For 436, the external service 417 then responds to the business logic tier 415, which then responds to the developer.

In this example, an option is to copy the developed application to an acceptance test environment 440. With this option, for 441 in the acceptance test environment 440, an administrator can first modify a set of named credentials 416 for a test. In one example, the credentials used in the named credential object 311 can have access to a different external service 417. In another example, the credentials can have read-only access to production data. As shown in 446, the administrator can then test that the credentials for each named credential object 311 have appropriate access to external services 417. For 451, a user at a user workstation 413 can then test the application, whereby the user workstation 413 is first authenticated by the host server 414, then executes the application on the business logic tier 415, which then calls the appropriate named credentials 416 by reference, which then connect to the external service 417. For 456, the external service 417 then responds to the business logic tier 415, which then responds to the user workstation 413 used for testing.

For 461, the application is then deployed into a deployed environment 460. In the deployed environment 460, a user at a user workstation 413 can then use the application, whereby the user workstation 413 is first authenticated by the host server 414, then executes the application on the business logic tier 415, which then calls the appropriate named credentials 416 by reference, which then connect to the external service 417. For 466, the external service 417 then responds to the business logic tier 415, which then responds to the user workstation 413 used for testing.

Data Structures

Figure 5A:
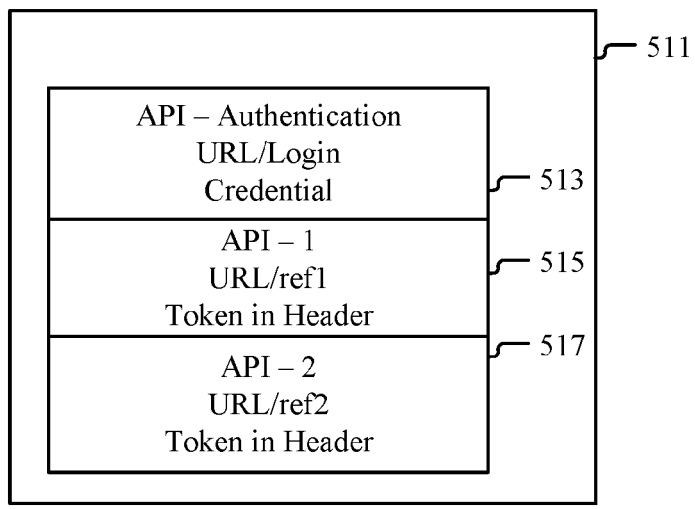
FIGS. 5A, 5B, and 5C (collectively FIG. 5) illustrate data structures for connections, users, and administrators of named credentials.
Figure 5B:
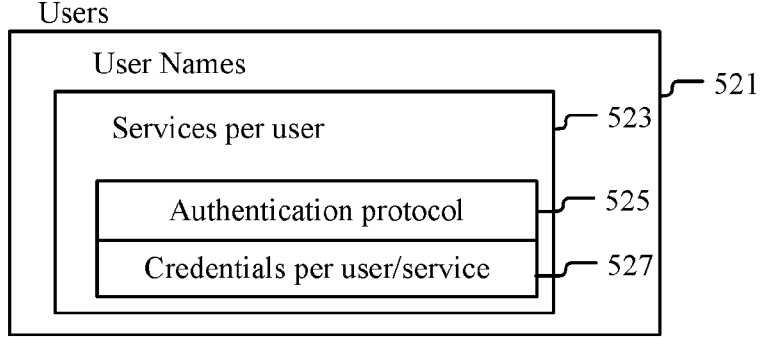
Figure 5C:
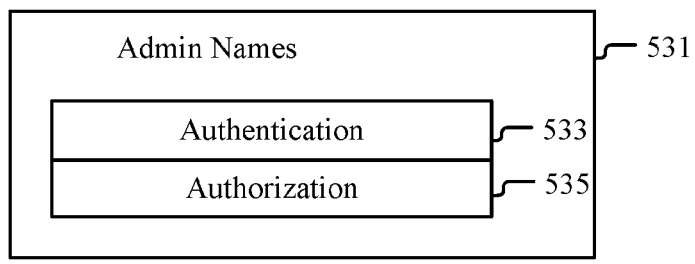

The connections to external services, users (including developers), and administrators each has a requirement for data storage for connection, authentication, and authorization information. FIGS. 5A, 5B, and 5C illustrate data structures for connections, users, and administrators of named credentials. FIG. 5A illustrates a connections object 511 that comprises login credentials 513 of user names and passwords. The login credentials 513 can be used by an organization, a group, or an individual within the organization. A first URL reference 515 contains a first token for a link to an external service. A second URL reference 517 contains an optional second token for a link to an external service. FIG. 5B illustrates a user data structure 521 comprised of a user name, a list of external services available to each user 523, and an authentication protocol 525 and user credentials 527 for each service available. An authentication protocol 525 can include Password Authentication Protocol (PAP), Challenge-handshake Authentication Protocol (CHAP), and Extensible Authentication Protocol (EAP). FIG. 5C illustrates an administrator data structure 531 comprised of an administrator name, administrator authentication information 533, and administrator authorization information 535.

A minimum requirement for a connections object 511 can be a connection login credential 513 for authentication, and an API for the first URL reference 515. A named credential object can address the root of a non-host service for an entire organization within a multi-tenant environment using one connections object 511. Individual resources can be identified by the consumer of the named credential object by appending to the URL contained within the URL references 515, 517. In one example, with a stateless protocol such as HTTP, a named credentials engine can access information in a named credential object each time a get or a post request is made, where the information is merged into the HTTP payload. In another example, a merge field feature can be used. For example, a SOAP request would require that a user ID and password be merged into an XML document. The technology disclosed can support merge fields such as username, password, oauthtoken, authorizationmethod, authorizationheadervalue, and oauthconsumerkey. In one example, named credential merge fields can be implemented as in the following code segment:

```
// prefix for the access token
    setHeader('Authorization', 'OAuth {!$Credential.OAuthToken}');
// nonstandard authentication
    req.setHeader('X-Username', '{!$Credential.UserName}');
    req.setHeader('X-Password', '{!$Credential.Password}');
```

Optionally, a user data structure 521 can be used to store information where a user, or a group of users, can obtain authentication specific to the user or group of users. In this example, the named credentials engine can apply the user credentials instead of the login credentials 513. An administrative data structure 531 can contain information about administrators of the named credential objects, their administrator authentication information 533, and their administrator authorization information 535. In another example, these data structures can contain tokens instead of credentials.

Figure 6:
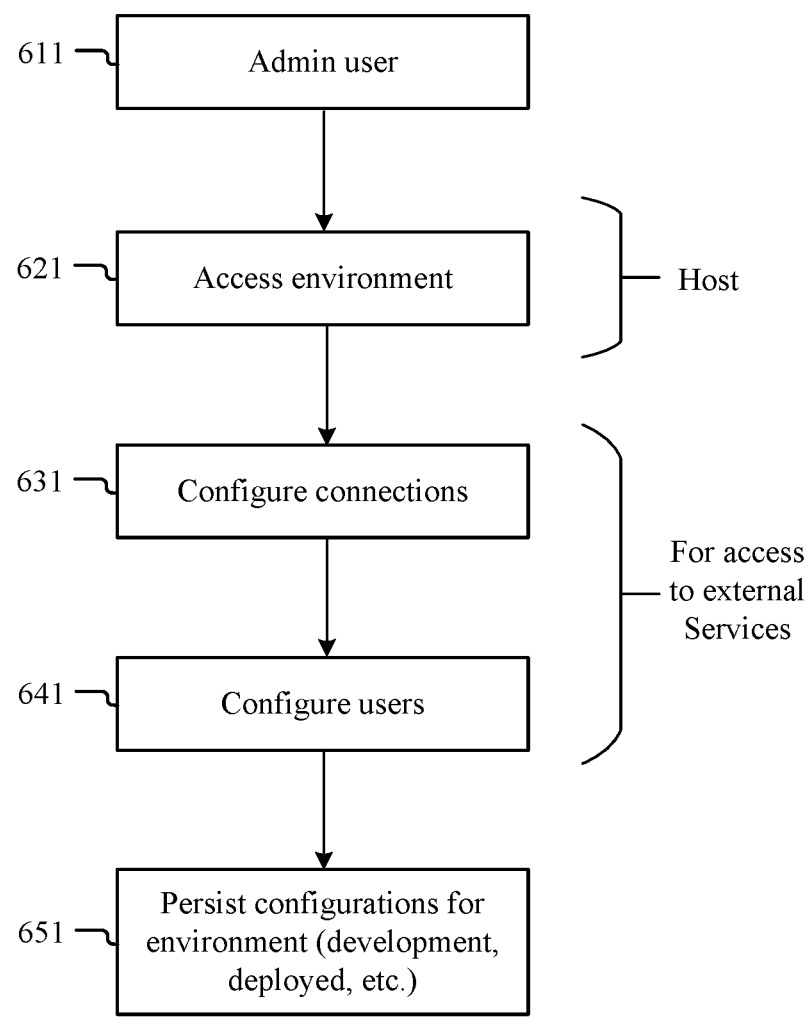
FIG. 6 illustrates one implementation of an administrator creating a named credential object.

FIG. 6 illustrates one implementation of an administrator creating a named credential object. In this implementation an administrative user 611 is first authenticated by a host for access to an environment 621. Once the administrator has been authenticated, the administrator then configures one or more named credential objects, which includes at least the configuration of connection information 631, for each environment. Optionally, the administrator can also configure user information 641 for specific users or group. The named credential objects are then made available to one or more environments as persistent objects 651, such as a development environment or a deployed environment, and one or more organizations within each environment. The named credential objects can then be called by reference by an application requiring access to a non-host service.

Figure 7:
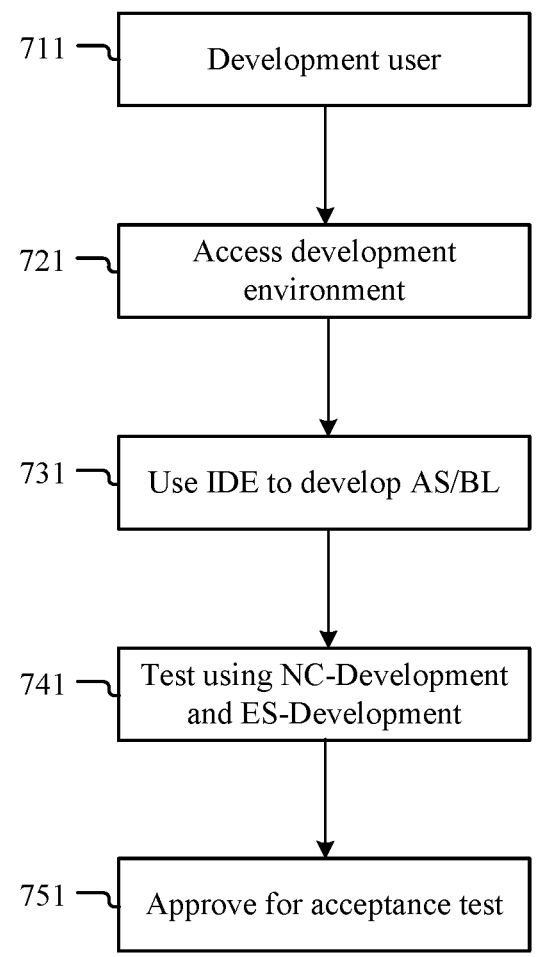
FIG. 7 illustrates one implementation of a developer using a named credential object in a development environment.

In this example, FIG. 7 illustrates one implementation of a developer using a named credential object in a development environment. In another example, the environment can be a test environment, or some other deployed environment. In yet another example, the application can come from a third party, where the application is written to work with named credentials. In this example, a developer 711 is first authenticated by a host for access to an environment 721. Once the developer has been authenticated, the developer then uses an IDE to develop an application utilizing a business logic tier 731. The application does not include authentication or connection information. Rather, the developer refers to a named credential object within the application. A named credentials engine can then resolve the named credential object by namespace, thereby allowing access to the non-host service available to the environment. In this example, a test can be performed using the named credentials within the development environment, and external services available to the development environment 741. If required, the developer can then approve the application for acceptance testing 751, or any other type of test or deployed environments.

Figure 8:
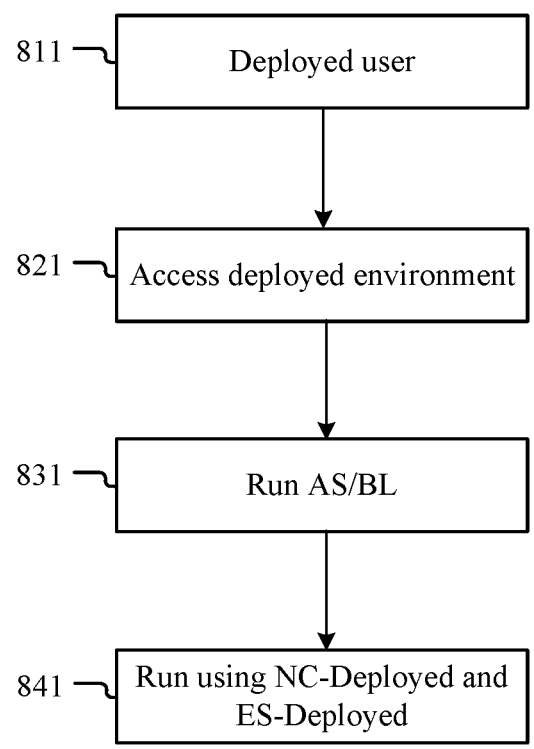
FIG. 8 illustrates one implementation of a deployed user using a named credential object in a deployed environment.

FIG. 8 illustrates one implementation of a deployed user using a named credential object in a deployed environment. FIG. 8 illustrates a deployed user 811 accessing a deployed environment by authenticating with a host 821 in the deployed environment. The deployed user can then execute the application developed by the developer, where the application refers to a named credential object by a name that can be resolved by a named credentials engine within the deployed environment 831. The named credentials engine can then inject the credentials into the request for services from the application, then forward the modified request for services to the external services engine 841.

Computer System

Figure 9:
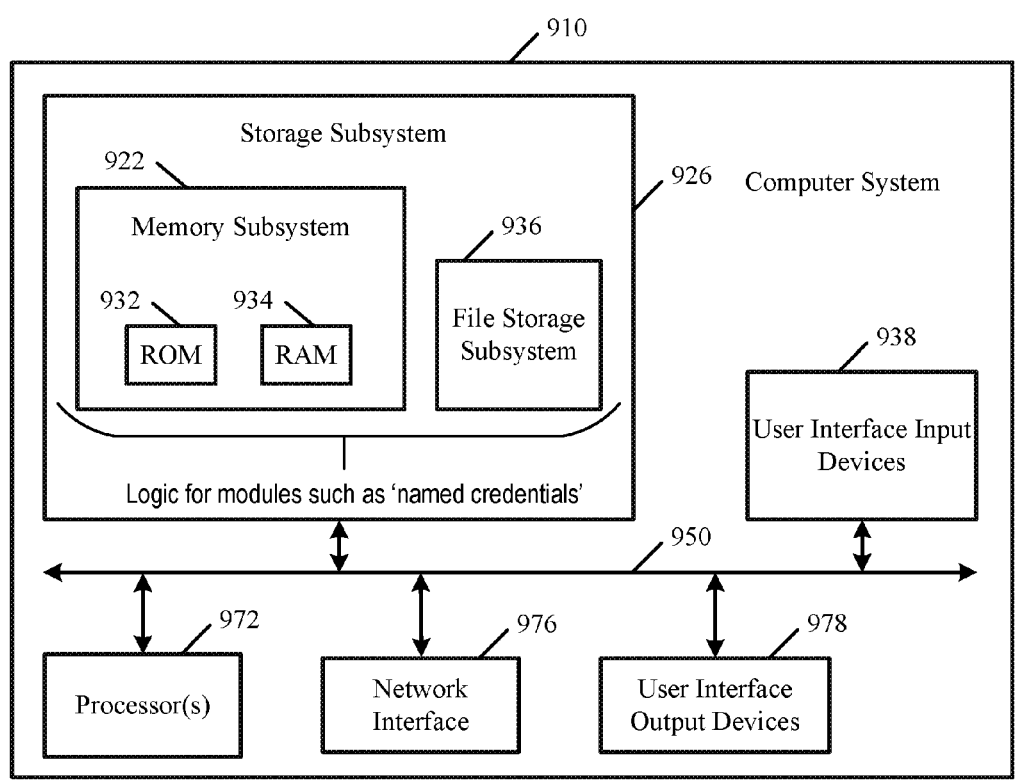
FIG. 9 is a block diagram for an example computer system that uses named credentials for authentication with external services.

FIG. 9 is a block diagram of an example computer system, according to one implementation. The processor can be an ASIC or RISC processor. It can be an FPGA or other logic or gate array. It can include graphic processing unit (GPU) resources. Computer system 910 typically includes at least one processor 972 that communicates with a number of peripheral devices via bus subsystem 950. These peripheral devices can include a storage subsystem 926 including, for example, a memory subsystem 922 and a file storage subsystem 936, user interface input devices 938, user interface output devices 978, and a network interface subsystem 976. The input and output devices allow customer interaction with computer system 910. Network interface subsystem 976 provides an interface to outside networks, including an interface to corresponding interface devices in other computer systems.

User interface input devices 938 can include a keyboard; pointing devices such as a mouse, trackball, touchpad, or graphics tablet; a scanner; a touch screen incorporated into the display; audio input devices such as voice recognition systems and microphones; and other types of input devices. In general, use of the term "input device" is intended to include all possible types of devices and ways to input information into computer system 910.

User interface output devices 978 can include a display subsystem, a printer, a fax machine, or non-visual displays such as audio output devices. The display subsystem can include a cathode ray tube (CRT), a flat-panel device such as a liquid crystal display (LCD), a projection device, or some other mechanism for creating a visible image. The display subsystem can also provide a non-visual display such as audio output devices. In general, use of the term "output device" is intended to include all possible types of devices and ways to output information from computer system 910 to the user or to another machine or computer system.

Storage subsystem 926 stores programming and data constructs in non-transitory computer readable memory using machine readable data structures that provide the functionality of some or all of the modules and methods described herein. These software modules are generally executed by processor 972 alone or in combination with other processors.

Memory subsystem 922 used in the storage subsystem 926 can include a number of memories including a main random access memory (RAM) 934 for storage of instructions and data during program execution and a read only memory (ROM) 932 in which fixed instructions are stored. A file storage subsystem 936 can provide persistent storage for program and data files, and can include a hard disk drive, a floppy disk drive along with associated removable media, a CD-ROM drive, an optical drive, or removable media cartridges. The modules implementing the functionality of certain implementations can be stored by file storage subsystem 936 in the storage subsystem 926, or in other machines accessible by the processor.

Bus subsystem 950 provides a mechanism for letting the various components and subsystems of computer system 910 communicate with each other as intended. Although bus subsystem 950 is shown schematically as a single bus, alternative implementations of the bus subsystem can use multiple busses. Computer system 910 can be of varying types including a workstation, server, computing cluster, blade server, server farm, or any other data processing system or computing device. Due to the ever-changing nature of computers and networks, the description of computer system 910 depicted in FIG. 9 is intended only as one example. Many other configurations of computer system 910 are possible having more or fewer components than the computer system depicted in FIG. 9.

The examples described above should not be taken as limiting or preferred. These examples sufficiently illustrate the technology disclosed without being overly complicated, and are not intended to illustrate all embodiments of the technology disclosed. A person having ordinary skill in the art will appreciate that there are many potential applications for one or more implementations of this disclosure.

One of ordinary skill in the art can appreciate that a computer or other client device can be deployed as part of a computer network. In this regard, the technology disclosed pertains to any computer system having any number of memory or storage units, and any number of applications and processes occurring across any number of storage units or volumes. The technology disclosed can apply to an environment with server computers and client computers deployed in a network environment, having remote or local storage. The technology disclosed can also apply to a standalone computing device, having programming language functionality, interpretation and execution capabilities.

The technology disclosed can be implemented in the context of any computer-implemented system including a database system, a multi-tenant environment, or the like. Moreover, this technology can be implemented using two or more separate and distinct computer-implemented systems that cooperate and communicate with one another. The disclosed technology can be implemented in numerous ways, including as a process, a method, an apparatus, a system, a device, a computer readable medium such as a computer readable storage medium that stores computer readable instructions or computer program code, or as a computer program product comprising a computer usable medium having a computer readable program code embodied therein.

As used herein, the "identification" of an item of information does not necessarily require the direct specification of that item of information. Information can be "identified" in a field by simply referring to the actual information through one or more layers of indirection, or by identifying one or more items of different information which are together sufficient to determine the actual item of information. In addition, the term "specify" is used herein to mean the same as "identify."

While the technology disclosed is disclosed by reference to the preferred embodiments and examples detailed above, it is to be understood that these examples are intended in an illustrative rather than in a limiting sense. It is contemplated that modifications and combinations will readily occur to those skilled in the art, which modifications and combinations will be within the spirit of the technology disclosed and the scope of the following claims. In some implementations, data stores can store information from one or more tenants into tables of a common database image to form an on-demand database service (ODDS), which can be implemented in many ways, such as a multi-tenant database system (MTDS). A database image can include one or more database objects. In other implementations, the databases can be relational database management systems (RDBMSs), object oriented database management systems (OODBMSs), distributed file systems (DFS), no-schema database, or any other data storing systems or computing devices.

SOME PARTICULAR IMPLEMENTATIONS

The technology disclosed provides access to credentials for external, non-host services. During application development, the method includes providing access by business logic in a development environment to external services via endpoints and credentials encapsulated in named credential objects, which are accessible via a development instance of a host-provided named credentials engine that is environment-specific to the development environment. The external services accessed are available from operators outside a host-security envelope, and the named credentials engine runs in memory that is securely separated from memory space exposed to a developer by either development tools in the development environment or the business logic under development. Upon application deployment, the technology disclosed provides access to the external services via a deployed instance of the host-provided named credentials engine, with access to the deployed instance that matches access to the development instance of the host-provided named credentials engine. The business logic can be promoted from the development environment to a deployed environment without needing to modify access to the named credential objects or to the named credentials engine by providing access to a deployed instance of the host-provided named credentials engine in place of the development instance of the host-provided named credentials engine, because access by the business logic to the deployed instance matches access to the development instance.

The development instance of the named credentials engine can provide encapsulated endpoints and credentials that are specific to, and changed for deployment with, the deployed instance of the host-provided named credentials engine, and external services that are independent of a host that provides the host-provided named credentials engine. The host-provided named credentials can receive a credential name and construct an authentication header based on at least the credential name that can be injected into a subsequent request to the external service. The host-provided named credentials engine can receive an update to an endpoint used with a named credential and modify the endpoint invoked by the named credential without modifying an application that uses the named credential to invoke the endpoint. Credentials can be stored in a hierarchy where user credentials can be shared between multiple users or organizations. The hierarchy can also include inheritance.

The host-provided named credentials engine can receive a credential name and accessing environment variables that identify a user or role, and construct an authentication header based on at least the credential name and environment variables that can be injected into a request to the external service. The host-provided named credentials engine can receive a credential name and access environment variables that identify an organization, construct an authentication header based on at least the credential name and the organization that can be injected into a request to the external service. The authentication header conforms to an HTTP standard for an Authorization Header Field.

The technology disclosed can refresh a user credential based on an authentication protocol employed during a callout. The host-provided named credentials engine can receive a credential name, construct an authentication header based on at least the credential name, and combine the authentication header with other HTTP header fields to inject authentication information into an HTTP header without exposing underlying credentials to the developer. A deployed instance of the host-provided named credentials engine can receive an update request from an end user to change underlying credentials used with a named credential and update a corresponding instance of the named credential.

The technology disclosed provides access to credentials for external, non-host services. During application development, the method includes providing access by business logic to external services via endpoints and credentials encapsulated in development instances of named credential objects, which are accessible via a host-provided named credentials engine. The external services accessed can be available from operators outside a host-security envelope, and the named credentials engine runs in memory that is securely separated from memory space exposed to a developer by either development tools in the development environment or the business logic under development. Upon application deployment, the technology disclosed provides access to the external services via the host-provided named credentials engine using deployed instances of the named credentials, with access to the deployed instances of the named credentials that matches access to the development instances of the named credentials. The business logic can be promoted from the development environment to a deployed environment without needing to modify access to the named credential objects or to the named credentials engine by providing access to a deployed instance of the host-provided named credentials engine in place of the development instance of the host-provided named credentials engine, because access by the business logic to the deployed instance matches access to the development instance.

Other implementations of the technology disclosed includes a system for providing access to credentials for external, non-host services, the system including a processor, the processor being configured with logic to perform any of the methods described above. System in this application refers to one or more computing devices processing instructions to carry out a method, as opposed to systematic thought. A "system" is not an organic brain thinking.

Other implementations include a non-transitory computer readable storage medium storing instructions executable by a processor to perform any of the methods described above. Yet another implementation includes a system including memory and one or more processors operable to execute instructions, stored in the memory, to perform any of the methods described above.

While the present technology is disclosed by reference to the preferred implementations and examples detailed above, it is to be understood that these examples are intended in an illustrative rather than in a limiting sense. It is contemplated that modifications and combinations will readily occur to those skilled in the art, which modifications and combinations will be within the spirit of the technology and the scope of the following claims.

What is claimed is:

1. A method for providing access to credentials for external services outside a security envelope of a host, the method comprising:
   generating, by an application server of a set of one or more application servers with logic, a data stream comprising named credential parameters of the logic, wherein the named credential parameters invoke a named credential object comprising end-point connection information and the credentials specific to a use context;
   transmitting, by the application server, the data stream to a named credentials engine,
      wherein the host provides a first instance of the named credentials engine specific to the use context;
   injecting, by the named credentials engine, the end-point connection information and the credentials of the named credential object into the data stream;
   forwarding the data stream comprising the end-point connection information and the credentials as a request to the external services;
   providing access, using the first instance of the named credentials engine, to a first use context, identified by the end-point connection information and the credentials, to the external services in response to the request;
   migrating the logic from the first use context to a second use context using a second instance of the named credentials engine,
      wherein the migrating the logic comprises changing, by the named credentials engine, the end-point connection information and the credentials to instantiate the second instance of the named credentials engine; and
   providing access to the second use context to the external services using the second instance of the named credentials engine in place of the first instance of the named credentials engine.

2. The method of claim 1, wherein the external services are independent of the host that provides the named credentials engine.

3. The method of claim 1, further comprising:
   receiving, by the named credentials engine, a credential name;
   constructing, by the named credentials engine, an authentication header based on at least the credential name; and
   injecting, by the named credentials engine, the authentication header into the request to the external services.

4. The method of claim 1, further comprising:
   receiving, by the named credentials engine, an update to an end-point used with the named credential object; and
   modifying, by the named credentials engine, the end-point, wherein an application that uses the named credential object to invoke the end-point is unmodified by modifying the end-point.

5. The method of claim 1, further comprising:
   storing the credentials in a hierarchy, wherein the credentials are accessible to multiple users or organizations.

6. The method of claim 1, further comprising:
   providing inheritance of the credentials from users in a hierarchy.

7. The method of claim 1, further comprising:
   receiving, by the named credentials engine, a credential name;
   accessing, by the named credentials engine, environment variables that identify a user, a role, a position, or an organization;
   constructing, by the named credentials engine, an authentication header based on at least the credential name and the environment variables; and
   injecting, by the named credentials engine, the authentication header into the data stream as the request to the external services.

8. The method of claim 7, wherein the authentication header conforms to an HTTP standard for an Authorization Header Field.

9. The method of claim 1, further comprising:
   refreshing a respective credential as required by an authentication protocol associated with the named credential object.

10. The method of claim 1, further comprising:
    receiving, by the named credentials engine, a credential name;
    constructing, by the named credentials engine, an authentication header based on at least the credential name; and
    combining, by the named credentials engine, the authentication header with other HTTP header fields, wherein a resulting HTTP header masks the credentials from the first use context or the second use context.

11. The method of claim 1, further comprising:
    receiving, by the second instance of the named credentials engine, an update request from an end user to change the credentials used with the named credential object; and
    updating, by the second instance of the named credentials engine, a corresponding instance of the named credential object.

12. A system for providing access to credentials for external services outside a security envelope of a host, the system comprising:
    a first processor of an application server of a set of one or more application servers with logic, the first processor configured to:

generate a data stream comprising named credential parameters of the logic,
    wherein the named credential parameters invoke a named credential object comprising end-point connection information and the credentials specific to a use context;
transmit the data stream to a named credentials engine,
    wherein the host provides a first instance of the named credentials engine specific to the use context; and
a second processor of the named credentials engine, the second processor configured to:
inject the end-point connection information and the credentials of the named credential object into the data stream; and
forward the data stream comprising the end-point connection information and the credentials as a request to the external services;
wherein the system is configured to:
provide access, using the first instance of the named credentials engine, to a first use context, identified by the end-point connection information and the credentials, to the external services in response to the request;
migrate the logic from the first use context to a second use context using a second instance of the named credentials engine,
    wherein to migrate the logic, the system is further configured to change, by the named credentials engine, the end-point connection information and the credentials to instantiate the second instance of the named credentials engine; and
provide access to the second use context to the external services using the second instance of the named credentials engine in place of the first instance of the named credentials engine.

13. A product, comprising a non-transitory computer readable memory and a machine readable data structure stored in the memory, configured to:
generate, from application logic, a data stream comprising named credential parameters,
    wherein the named credential parameters invoke a named credential object comprising end-point connection information and credentials specific to a use context;
transmit the data stream to a named credentials engine,
    wherein a host provides a first instance of the named credentials engine specific to the use context;
inject the end-point connection information and the credentials of the named credential object into the data stream;
forward the data stream comprising the end-point connection information and the credentials as a request to external services;
provide access, using the first instance of the named credentials engine, to a first use context, identified by the end-point connection information and the credentials, to the external services in response to the request;
migrate the application logic from the first use context to a second use context using a second instance of the named credentials engine,
    wherein to migrate the application logic, the product is further configured to change, by the named credentials engine, the end-point connection information and the credentials to instantiate the second instance of the named credentials engine; and
provide access to the second use context to the external services using the second instance of the named credentials engine in place of the first instance of the named credentials engine.

14. A method for providing access to credentials for external services outside a security envelope of a host, the method comprising:
during application development, providing access by application logic to the external services via end-points and the credentials encapsulated in a development instance of a named credential object accessible via a host-provided named credentials engine,
    wherein the host-provided named credentials engine runs in memory that is securely separated from memory space exposed to a developer by either development tools in a development environment or the application logic under development, and
    wherein the providing access comprises:
        generating, by an application server with the application logic, a data stream comprising named credential parameters of the application logic,
            wherein the named credential parameters invoke the named credential object comprising end-point connection information and the credentials specific to the development environment;
        transmitting, by the application server, the data stream to the host-provided named credentials engine,
            wherein the host provides a first instance of the host-provided named credentials engine specific to the development environment;
        injecting, by the host-provided named credentials engine, the end-point connection information and the credentials of the named credential object into the data stream;
        forwarding the data stream comprising the end-point connection information and the credentials as a request to the external services; and
        using the first instance of the host-provided named credentials engine to provide access to the developer, identified by the end-point connection information and the credentials, to the external services in response to the request; and
upon application deployment, providing access to the external services via the host-provided named credentials engine using a deployed instance of the named credential object,
    wherein the access via the deployed instance matches the access via the development instance of the named credential object, and
    wherein the providing access comprises:
    migrating the application logic from the development instance to the deployed instance of the named credential object using a second instance of the host-provided named credentials engine,
        wherein the migrating the application logic comprises changing, by the host-provided named credentials engine, the end-point connection information and the credentials to instantiate the second instance of the host-provided named credentials engine; and
    providing access to the developer to the external services using the deployed instance of the named credential object in place of the development instance of the named credential object,
        wherein the access to the named credential object and the access to the host-provided named credentials engine are unmodified by the migrating.

15. A system for providing access to credentials for external services outside a security envelope of a host, the system comprising a processor, the processor configured to:
during application development, provide access by logic to the external services via end-points and the credentials encapsulated in a development instance of a named credential object-accessible via a host-provided named credentials engine,
wherein the host-provided named credentials engine runs in memory that is securely separated from memory space exposed to a developer by either development tools in a development environment or the logic under development, and
wherein, to provide access, the processor is further configured to:
generate a data stream comprising named credential parameters of the logic,
wherein the named credential parameters invoke the named credential object comprising end-point connection information and the credentials specific to the development environment;
transmit the data stream to the host-provided named credentials engine,
wherein the host provides a first instance of the host-provided named credentials engine specific to the development environment;
inject the end-point connection information and the credentials of the named credential object into the data stream;
forward the data stream comprising the end-point connection information and the credentials as a request to the external services; and
use the first instance of the host-provided named credentials engine to provide access to the developer, identified by the end-point connection information and the credentials, to the external services in response to the request; and
upon application deployment, provide access to the external services via the host-provided named credentials engine using a deployed instance of the named credential object,
wherein, to provide access, the processor is further configured to:
migrate the logic from the development instance of the named credential object to a deployed instance of the named credential object using a second instance of the host-provided named credentials engine,
wherein to migrate the logic, the processor is further configured to change, by the host-provided named credentials engine, the end-point connection information and the credentials to instantiate the second instance of the host-provided named credentials engine; and
provide access to the developer to the external services using the deployed instance of the named credential object in place of the development instance of the named credential object,
wherein the access to the named credential object and the access to the host-provided named credentials engine are unmodified by the migrating.

16. A product, comprising a non-transitory computer readable memory storing a machine readable data structure, configured to:
during application development, provide access by application logic to external services via end-points and the credentials encapsulated in a development instance of a named credential object accessible via a host-provided named credentials engine;
wherein the external services accessed are available from operators outside a host-security envelope,
wherein the host-provided named credentials engine runs in memory that is securely separated from memory space exposed to a developer by either development tools in a development environment or the application logic under development, and
wherein, to provide access, the product is further configured to:
generate a data stream comprising named credential parameters of the application logic,
wherein the named credential parameters invoke the named credential object comprising end-point connection information and the credentials specific to the development environment;
transmit the data stream to the host-provided named credentials engine,
wherein a host provides a first instance of the host-provided named credentials engine specific to the development environment;
inject the end-point connection information and the credentials of the named credential object into the data stream;
forward the data stream comprising the end-point connection information and the credentials as a request to the external services; and
use the first instance of the host-provided named credentials engine to provide access to the developer, identified by the end-point connection information and the credentials, to the external services in response to the request; and
upon application deployment, provide access to the external services via the host-provided named credentials engine using a deployed instance of the named credential object,
wherein, to provide access, the product is further configured to:
migrate the application logic from the development environment to the deployed environment using a second instance of the host-provided named credentials engine,
wherein to migrate the application logic, the product is further configured to change, by the host-provided named credentials engine, the end-point connection information and the credentials to instantiate the second instance of the host-provided named credentials engine; and
provide the access to the external services to the developer, using the deployed instance of the named credential object in place of the development instance of the named credential object,
wherein the access to the named credential object and the access to the named credentials engine are unmodified by the migrating.

17. The method of claim 1, wherein the use context comprises an environment of a plurality of users with a plurality of roles, a plurality of positions, or a plurality of organizations.

18. The method of claim 1, wherein the use context comprises an environment of a plurality of environments, each comprising at least one of the set of one or more application servers with the logic,
wherein the plurality of environments comprise the first use context including a first environment with at least a first application server and the second use context including a second environment with at least a second application server, and wherein the named credentials engine is specific to the first environment as a first instance of the named credentials engine or is specific to the second environment as a second instance of the named credentials engine.

19. The method of claim 1, wherein the named credentials engine runs in memory that is securely separated from the application server.

20. The system of claim 12, wherein the use context comprises an environment of a plurality of environments, each comprising at least one of the set of one or more application servers with the logic, wherein the plurality of environments comprise the first use context including a first environment with at least a first application server and the second use context including a second environment with at least a second application server, and wherein the named credentials engine is specific to the first environment as a first instance of the named credentials engine or is specific to the second environment as a second instance of the named credentials engine.

21. The product of claim 13, wherein the use context comprises an environment of a plurality of environments, each comprising at least one of a set of one or more application servers with the application logic, wherein the plurality of environments comprise the first use context including a first environment with at least a first application server and the second use context including a second environment with at least a second application server, and wherein the named credentials engine is specific to the first environment as a first instance of the named credentials engine or is specific to the second environment as a second instance of the named credentials engine.

* * * * *